United States Patent [19]

Hager

[11] 4,220,997

[45] Sep. 2, 1980

[54] PROCESS AND APPARATUS FOR TRANSFERRING INFORMATION BETWEEN AN INFORMATION STORE AND A DATA CHANNEL

[75] Inventor: Horst Hager, Schloss Neuhous, Fed. Rep. of Germany

[73] Assignee: Nixdorf Computer AG, Paderborn, Fed. Rep. of Germany

[21] Appl. No.: 819,615

[22] Filed: Jul. 27, 1977

[30] Foreign Application Priority Data

Sep. 4, 1976 [DE] Fed. Rep. of Germany ....... 2639895

[51] Int. Cl.² .................... G06F 13/04; G11B 15/46
[52] U.S. Cl. ........................ 364/900; 360/73
[58] Field of Search ... 364/900 MS File, 200 MS File; 360/73, 51

[56] References Cited

U.S. PATENT DOCUMENTS

| 2,905,930 | 9/1959 | Golden | 364/900 |
|---|---|---|---|
| 3,406,378 | 10/1968 | Bradford | 364/900 |
| 3,967,316 | 6/1976 | Suyama et al. | 360/51 |
| 4,003,090 | 1/1977 | Beck | 360/73 X |
| 4,028,666 | 6/1977 | Suzuki et al. | 364/200 |

FOREIGN PATENT DOCUMENTS 2460790  6/1975  Fed. Rep. of Germany ............ 360/51

Primary Examiner—Raulfe B. Zache
Attorney, Agent, or Firm—Blanchard, Flynn, Thiel, Boutell & Tanis

[57] ABSTRACT

A process and apparatus for transferring information between an information store and a data channel. During the recording process, the quantity of information to be recorded and, in the reading process, the capacity of an apparatus associated with the data channel to be fed with the information read, is determined and, based upon the quantity of information determined in each case, the control magnitude is produced to drive the information store at a predetermined speed. Circuitry is provided for controlling the amplitude and phase of the information read from the information store to compensate for any variations in the speed of the information store.

17 Claims, 8 Drawing Figures

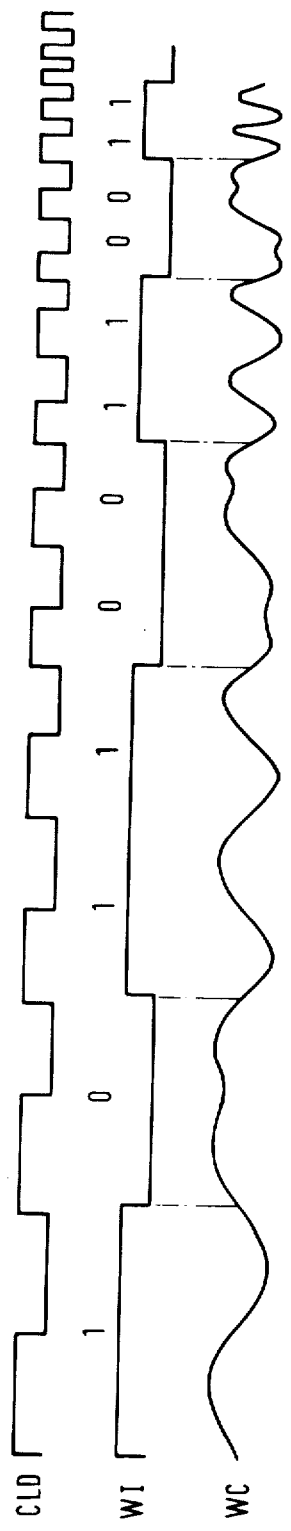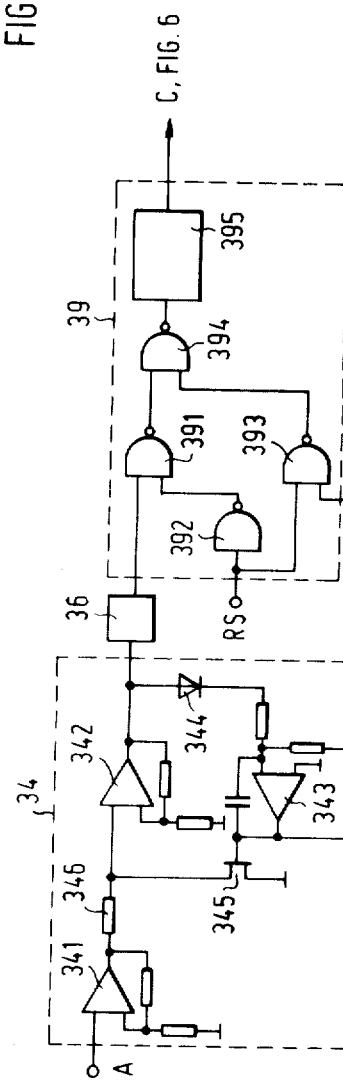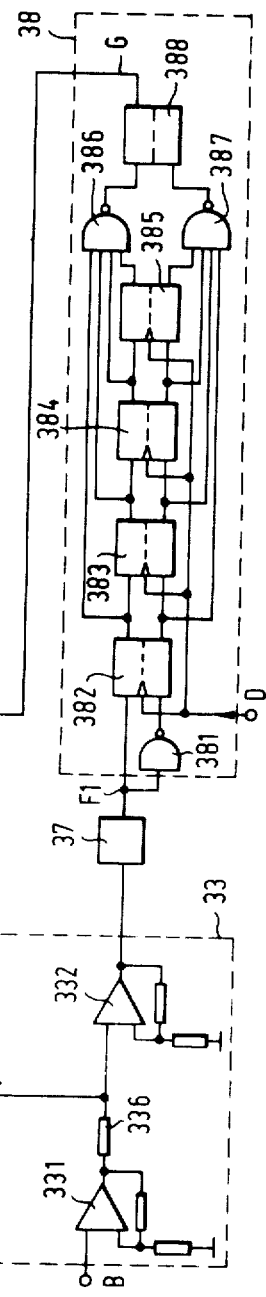

PROCESS AND APPARATUS FOR TRANSFERRING INFORMATION BETWEEN AN INFORMATION STORE AND A DATA CHANNEL

FIELD OF THE INVENTION

The invention relates to a process for transferring information in both directions between a sequential, intermittently operating information store controlled with a control magnitude which gives a prescribed speed and a data channel in data processing equipment. The invention also relates to an apparatus for carrying out the process.

BACKGROUND OF THE INVENTION

Intermittently operating sequential information stores generally have a storage medium in the form of a tape which is moved between two reels and for this purpose is guided round a so-called capstan on which it abuts closely. The capstan is coupled to an intermittently operating drive to which a positioning signal can be supplied which is obtained from a comparison of the actual speed with the prescribed speed giving the control magnitude. For this purpose, the speed of the information store can be regulated so as to keep it as constant as possible, and it is possible to control the acceleration up to a prescribed nominal speed and to control the slowing down to a standstill, according to a prescribed characteristic.

The recording of information in an intermittently moving information store is generally carried out in the form of blocks of information signals separated from one another by gaps. The length of these gaps between the blocks is kept constant, as agreed, for different customary recording processes, independently of the nominal speed of the corresponding tape store. This property is a precondition for tape stores to be capable of being read and recorded in conjunction with different drive mechanisms. The drive mechanisms must be dimensioned so that they accelerate the tape store from a standstill to the nominal speed or brake the store from the nominal speed to a standstill within half a length of the gaps between the blocks. Therefore, high nominal speeds always involve a high rate of acceleration or braking. In known apparatus, a mechanical buffer arrangement, for example, is provided in the form of tape loops which are formed in vacuum chambers. Mechanical lever apparatus may also be provided which likewise produce a tape loop and thus reduce the effect of mass inertia, particularly on acceleration to the nominal speed.

Mechanically complicated and expensive drives of this kind do indeed enable the required acceleration and braking values to be obtained even at high nominal speeds, but apparatus of this kind are prone to break down with regard to their complicated construction, so that they cannot fulfil the task of guaranteeing the greatest possible use of the available storage space completely satisfactorily.

The object of the invention is to provide a process by means of which at least the degree of use of an information store hitherto possible is obtained and despite high nominal speeds there is no need for a complicated drive apparatus with high acceleration and braking values.

A process of the kind mentioned above for solving this problem consists according to the invention, in that in the writing process the quantity of information to be recorded is determined and during the reading process the capacity of an apparatus associated with the data channel and to be fed with the information after it has been read is determined and that the control magnitude which gives a prescribed speed for the information store is produced from the quantity of information determined in each case.

The invention results in the essential advantage that it is not necessary to have the information store start up quickly and come to a halt quickly or to carry out the recording process and the reading process at a constant nominal speed. On the contrary, the information store is also used when it is starting up or slowing down. Owing to the fact that the control magnitude giving a prescribed speed for the information store is derived from the information to be recorded or from the capacity for receiving information which is to be read, no prescribed constant nominal speed is obtained, but rather a prescribed speed is obtained which in each case only has the value which has to be attained in order to record an available quantity of information in the information store and then slow down the information store, when the quantity of outstanding information has decreased, so that it comes to a standstill as it records the last piece of information. This enables the information store to be accelerated to a relatively low prescribed speed in most cases, thus substantially reducing the time wasted thereby, compared with previous arrangements. The prescribed speed reached in each case can then be varied during the further course of the recording or reading process, in accordance with the quantity of outstanding information or the capacity to receive information which is to be read. The synchronous control of the recording and reading processes can be carried out by means of a timing signal, as will be shown, which is derived from the movement of the information store and is already known per se for other purposes.

The process can be further developed so that the control magnitude is derived from the level of fullness of a cyclically operating buffer store provided in the data channel and permitting asynchronous transfer into and out of the store. A buffer store of this kind is also called a FIFO store (FIRST-IN-FIRST-OUT). This is a buffer store wherein, during operation, the sequence of information fed into the store is retained for removal from the store, so that the flow of information between the data channel and the information store and vice versa is not disrupted but merely delayed.

The use of a buffer store makes it possible to carry out the recording and reading processes for the information store independently of the starting up and slowing down. Moreover, the quantity of information or the available capacity of the device to be fed with read information can be determined particularly simply, as will be described hereinafter.

The control magnitude can advantageously be obtained by comparing the counter positions of two address counters which on the one hand count the addressing processes during recording into the buffer store and on the other hand count the addressing processes during removal of information from the buffer store. In this way, it is possible to carry out a simple subtraction of the two counter positions and directly obtain a signal therefrom which gives the level of fullness of the buffer store. If this signal is inverted during the reading process, this means that, for subtraction, the number of addressing processes during removal of information is not subtracted, for example, from the number of addressing processes during input of information, but that the reverse process is carried out, so that in this way the available empty space in the buffer store, i.e. the capacity of the buffer store to receive information, is determined. The inversion of the signal enables the address counters to be connected to the buffer store and the comparison device in a particularly simple way, without reversing switches.

Instead of comparing the contents of two counters which count the addressing processes, it is, of course, also possible to associate a special calculating apparatus with the buffer store, which apparatus operates analogously to the counting and comparing processes described and also yields a control magnitude which gives the quantity of information due to be recorded or the capacity of the apparatus which is to be fed with the information read. However, it is relatively simple to control the buffer store by means of address counters and to derive the control magnitude by comparison, since the address counters are used for both functions.

In order that the control magnitude can be used for directly controlling the drive for the information store, a digital-to-analog converter which delivers the control magnitude analogously for the drive of the information store is required, with regard to the above-described principle of producing the control magnitude, which is connected to a digital display.

A timing signal for controlling the recording process and reading process for the information store is appropriately obtained from a timing signal store moved in synchronism with the information store, and having a frequency proportional to the storage speed. For this purpose, for example, a timing disc may be provided on a common axis with the capstan driving the information store, this disc containing a permanently stored timing signal and having an associated special reading device for this timing signal.

The timing signal store provides a very accurate timing signal which is directly related to the speed of the information store. In this way, a constant optimum information density is possible during the recording process.

In a further development of the process, the timing signal is supplied to a control circuit for producing a constant amplitude of the timing signal, and the positioning signal of this control circuit is used to set the amplitude for the information signals obtained during the reading process. Since, owing to the variable speed of the information store during the recording and reading process, the particular information signals stored, and also the information signals obtained during the reading process have a variable amplitude, it is necessary to set the amplitude in this way so as to obtain as constant an amplitude as possible. The further development of the invention described above makes this possible in a particularly simple way, since, in order to keep the amplitude of the timing signal constant, a positioning signal is available which may simultaneously be used to level out the amplitude of the information signals obtained during the reading process.

Furthermore, this feature prevents signal distortions after gaps between blocks when the information store is being read, and there is no need to allow a special relatively long period of time for a so-called synchronization bias, since there is no regulating time constant produced by a special adjustment required to avoid distortion.

In the feature described above, it is very advantageous to proceed so that the timing signal with a constant amplitude during the recording process and the recording signal with a constant amplitude synchronize a central timing generator with regard to frequency and phase. The central timing generator is provided in order to prepare timing signals which are derived, on the one hand from the timing signal store, and on the other hand from the information read. The central timing generator then delivers a stable timing signal for the recording and reading processes.

If the frequency of the central timing generator is a multiple of the fundamental frequency of the timing signals obtained from the timing signal store, it is possible to carry out filtering independently of the speed of the information store so that only the read signals which have a prescribed minimum length are evaluated, so that shorter interference signals are not evaluated.

By the preparation of the timed signals carried out using the central timing generator, the errors which could be caused by differences in phase or frequency owing to slip between the information store and its drive are avoided.

The embodiment of the process according to the invention described above can be carried out so that the reading signal is fed through a low-pass filter the critical frequency of which changes with the timing frequency. This filtering increases the signal-to-noise ratio for signals below the critical frequency of the filter. In this way, the signals supplied by the reading head can be amplified more greatly than without a filter, without resulting in erroneous signal evaluations. A read amplifier of this kind is less sensitive to fading of the information signal of the kind which occurs, for example, with flutter, slight dirtying or defective magnetic layers in the information store.

An apparatus for carrying out the process according to the invention is essentially characterized in that a cyclically operating buffer store which enables asynchronous storage and retrieval from the store is provided, having an associated circuit which evaluates its level of fullness, for supplying the control magnitude. The circuit which evaluates the level of fullness may comprise an address counter which counts the storage operations and an address counter which counts the information retrieval operations of the buffer store, whilst the address counters are connected to a comparison circuit which compares the counter positions and gives the control magnitude at the output. As has already been explained, this involves a particularly simple construction of the circuit which is made even more favourable by using a differential counter as the comparison circiut. In order that the control signal derived from the control magnitude for driving the information store has the appropriate analogous characteristics, the circuit which evaluates the level of fullness has a digital-to-analog converter connected behind it, which is controlled by the control magnitude.

If, in the apparatus described above, a magnetic tape store is provided as the information store with a drive mechanically coupled to a timing signal store, this means that, when the timing signals are derived, to some extent a measured value delivered directly by the drive of the information store is used as the starting value. This principle results in substantially more accurate timing signals than when the value is derived from prescribed signals for the drive. The advantage of this principle primarily consists in the fact that, despite a variable speed of the drive of the information carrier, a constant information density is obtained at the information carrier.

A magnetic drum or magnetic disc provided on its circumference with stored timing signals may be provided as the timing signal store on the drive shaft of the magnetic tape store. This enables very high resolution of the circumferential angle or of the spacing between individual timing signals. As a result, the accuracy in obtaining the timing signals is increased further. It is possible to provide the timing signals on the timing signal store more accurately than on the magnetic tape store, and the only requirement is that the diameter of the timing signal store should be correspondingly large. This involves a very accurate phase position of the timing signals during recording in the timing signal store. The use of a separate drum- or disc-shaped timing signal store also enables a higher or lower timing signal frequency compared with the frequency of timing signals on the magnetic tape store.

For preparing signals read by the information store and the timing signal store, an amplitude-adjusting circuit with a regulating circuit associated with the timing signal channel is provided, the adjusting magnitude of which also serves for amplitude adjusting of the information signals. As explained above, the use of a low-pass filter with a critical frequency dependent on the speed of the information store and mounted in the information signal channel results in particular advantages with regard to the lowest possible error rate during reading of the information signals.

The low-pass filter may be formed by bistable circuits connected one behind another in the manner of a shift register, the outputs of which, for the first switching state, control the first input of another bistable circuit, via a NAND connection and the outputs of which for the second switching state control the second input of the other bistable circuit via another NAND connection. This comparatively simple construction of the low-pass filter as a digital shift register is advantageous because the evaluation and totalling of the members of the chain formed by the bistable circuits is carried out by means of the NAND connections which at the same time have a threshold function. The other bistable circuit takes over the storage of the initial value of the chain in the hysteresis region between the individual threshold junctions.

The timing signal channel and the information signal channel are advantageously fed together to a circuit for producing edge impulses. Thus, a single circuit is used for evaluating the accurate timing signals of the timing signal store for the recording process and for evaluating the timing information from the information store during the reading process. This circuit appropriately controls a phase discriminator circuit which serves to synchronize a central timing generator. This results in an exceptionally stable and accurate-phase timing of all recording and reading processes. The phase discriminator circuit makes it possible to adapt to different speeds of the information store, since the central timing generator can be controlled by means of a control voltage.

If the central timing generator operates with a substantially higher frequency, preferably eight times the frequency of the timing signals, during the reading process, and controls the timing inputs of the bistable circuits of the low-pass filter with its output signals, the low-pass filter is thus directly controlled by the signals supplied by the central timing generator. During the recording process, the central timing generator may operate at the same increased frequency.

Behind the central timing generator may be connected a step-down circuit for reducing the frequency of its output signals. This step-down circuit then delivers the timing signals for recording and reading information in the information store. The use of a step-down circuit makes it very easy to use the step-down stages in the reading process for delivering signals with which the signal frequencies for the phase comparison already described can be adapted.

Advantageously, a fixed-phase regulating circuit is provided as the phase discriminator circuit and is controlled by the coded information signals. It may contain, basically, two bistable circuits, whilst the timing input of one bistable circuit is controlled by the output signals of the circuit for producing edge impulses, the timing input of the second bistable circuit is controlled by the reading timing signals of the step-down circuit, both bistable circuits are reset by means of a NAND connection which is controlled by the 0-output signal of the first bistable circuit and the 1-output signal of the second bistable circuit, and the 1-output signal of the first bistable circuit and the 0-output signal of the second bistable circuit are used to increase or reduce a control voltage for the central timing generator.

This method of synchronizing the central timing generator is very accurate and has particular advantages with regard to great safety in recognizing the data signals. As will be shown hereinafter, erroneous evaluation of the signals can be avoided by means of very simple additional measures when individual signal elements are missing from the incoming signals.

BRIEF DESCRIPTION OF THE DRAWINGS

An exemplary embodiment of the invention and partial circuits for regulating and preparing the signals are described hereinafter with reference to the figures, wherein:

FIG. 3 illustrates the signal paths for the timing signals obtained from the timing signal store and the information signals to be recorded in the information store;

FIG. 5 is a block circuit diagram of a regulating and signal-preparing circuit shown in FIG. 1;

DETAILED DESCRIPTION

Figure 1:
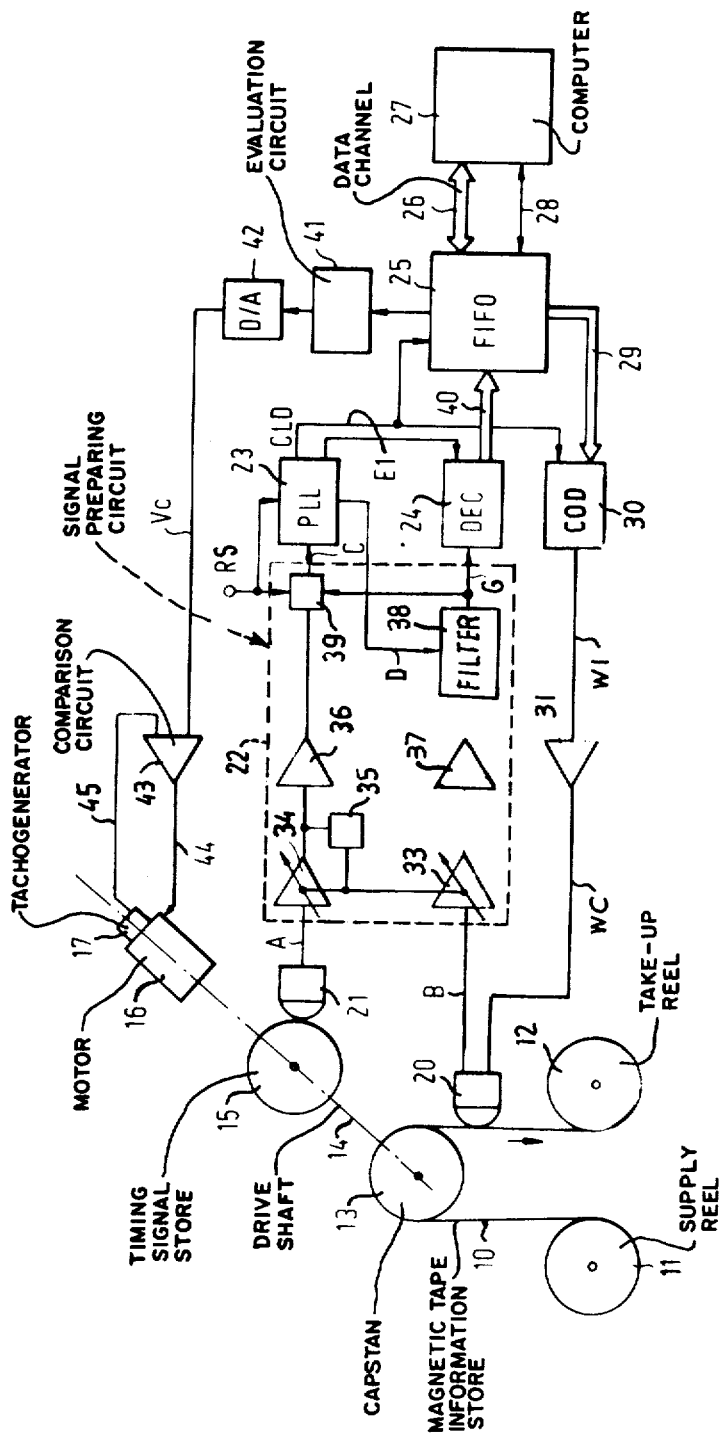
FIG. 1 is a schematic block diagram for the transfer of information in both directions between an intermittently moving sequential information store and a data channel which leads to a computer.

FIG. 1 shows the block circuit diagram of a device, associated with an information store, for transferring information in both directions between this store and a data channel. A magnetic tape store is provided as the information store, the magnetic tape 10 of which is moved between a supply reel 11 and a take-up reel 12. For this purpose, the magnetic tape 10 is guided round a capstan 13 which is mounted on a drive shaft 14. On the same drive shaft is located a timing signal store 15 which may be constructed, for example, as a disc with timing signals permanently stored on its circumference. The shaft 14 is driven by a motor 16 coupled to a tachogenerator 17. The tachogenerator 17 serves to produce a signal which gives the relevant actual speed of the motor 16, this signal being fed into a comparator 43 via a line 45, this comparator comparing the signal with a prescribed signal and supplying a corresponding positioning signal to the motor 16 so that its speed can be kept at or adjusted to a predetermined value.

Magnetic heads 20 and 21, respectively, are associated with the magnetic tape 10 and the timing signal store 15. The magnetic head 20 enables information signals stored to be read or information to be recorded in the tape store 10, in known manner. It may be formed, in known manner, by a read/write head or a read/write/erase head.

The two magnetic heads 20 and 21 supply the signals read therewith via inputs A and B to a signal preparing circuit 22 which controls a phase and frequency synchronizing circuit 23 and a decoding circuit 24. The phase and frequency synchronizing circuit 23 supplies control signals to the decoding circuit 24 and to a coding circuit 30 at its output E1, by means of which any information to be recorded on the magnetic tape 10 by means of the magnetic head 20 is coded into a suitable representation, so that the signals released by this circuit 30 control the magnetic head 20 after amplification in an amplifier 31.

The information signals given by the decoding circuit 24 pass into a FIFO store 25 of the kind described which is associated with a data channel 26. This data channel 26 leads to a computer 27 which receives the information in question or releases it to the FIFO store 25. These processes are controlled by control signals which are transmitted via a control signal connection 28 between the computer 27 and the FIFO store 25.

Since it is intended to transfer information in both directions between the information store 10 and computer 27, another information channel 29 is shown by means of which information is fed from the FIFO store 25 into the coding circuit 30. This information is converted, in the manner described above, into a suitable form for recording on the magnetic tape 10.

FIG. 1 also shows a circuit 41 which evaluates the level of fullness of the FIFO store 25 and has a digital-to-analog converter 42 connected behind it. This converter supplies the control magnitude, which gives a prescribed speed for the information store 10, to the comparison circuit 43.

The signal preparing circuit 22 contains two regulating amplifiers 33 and 34 each of which has a limiting amplifier 37 and 36, respectively, connected behind it. The timing signals given by the limiting amplifier 36 and originating from the timing signal store 15 are sent to a connecting and signal forming circuit 39 which in turn controls the phase and frequency synchronizing circuit 23. Behind the limiting amplifier 37 is connected a filter 38 which controls the decoding circuit 24 with the information signals read by the magnetic tape 10. The filter 38 receives control signals through its input D from the phase and frequency synchronizing circuit 23 and effects filtering of the information signals read, regardless of speed, in a manner to be described below, so that any brief interference signals are substantially cut out.

Since the information store 10 operates at a variable speed, the information signals or timing signals read have a varying amplitude. In order to obtain evaluatable signals of a constant amplitude, the two regulating amplifiers 33 and 34 are provided which eliminate changes in amplitude resulting from changes in speed, so that substantially constant amplitudes are available at the inputs of the limiting amplifiers 36 and 37.

As already described, by means of the circuit 41 which evaluates the level of fullness of the FIFO store 25 it is determined how large the quantity of information is which is ready for recording on the magnetic tape 10 and how great the receiving capacity of the FIFO store 25 is in the reading operation. In dependence on these quantities of information, a digital signal is supplied to the digital-to-analog converter 42 which in turn delivers an analog control magnitude for controlling the comparison process in the comparison circuit 43. As described, the speed of the drive motor 16 can then be controlled so that the information store 10 is adjusted to a speed which depends on the quantity of information to be recorded or the quantity of information which can be received by the FIFO store 25, and is thus optimally adapted to the particular operational conditions.

FIG. 1 shows a control signal input terminal for a control signal RS. This control signal characterises the particular reading process, i.e. the removal of information signals from the magnetic tape 10.

Figure 2:
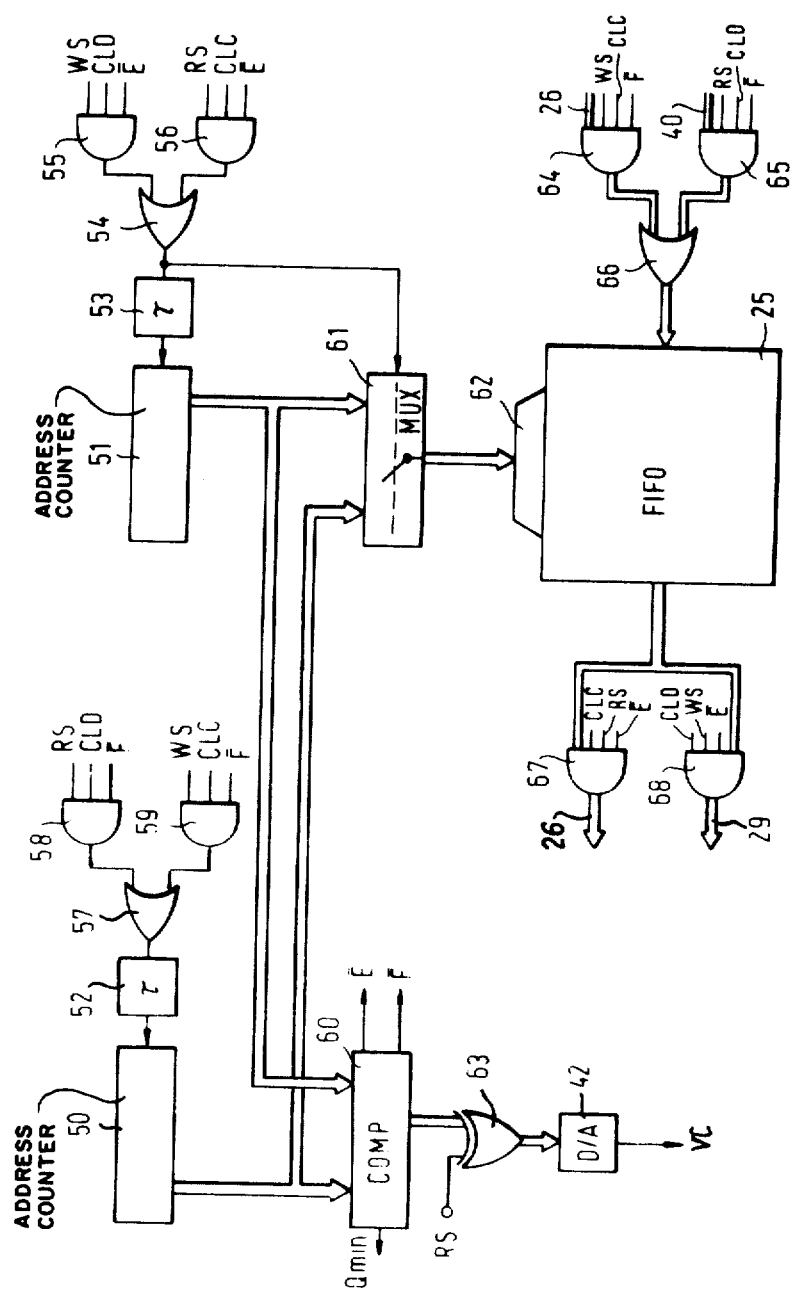
FIG. 2 is a block diagram of the reciprocal activity of control signals and information signals for producing the control magnitude which provides the prescribed speed, when a buffer store of the type described is used.

FIG. 2 shows, in more detail, the method of controlling the FIFO store 25 and evaluating its level of fullness or receiving capacity. The control of the FIFO store 25 with information signals released via the data channel 26 from the computer 27 (FIG. 1) and via the data channel 40 from the decoding circuit 24, is carried out, in the exemplary embodiment shown, via AND connections 64 and 65 and an OR member 66. The FIFO store 25 releases information signals on the one hand to the computer 27 via the data channel 26 and on the other hand to the information store via the information signal channel 29. For this purpose, two AND connections 67 and 68 are provided.

For feeding information signals into and removing them from the FIFO store 25, addressing is carried out via an address decoder 62. Addressing is controlled via a multiplexer 61 which is in turn switched by means of a control signal appearing at the output of an OR member 54. This control signal characterises a storage or retrieval process and causes changeover of the multiplexer 61 either to the output of an address counter 50 or to the output of an address counter 51. The two address counters 50 and 51 count the addressing operations for the retrieval or storage information in the FIFO store.

The outputs of the two address counters 50 and 51 are also connected to the inputs of a comparison circuit 60 which, for example by subtraction, supplies a control signal which gives the relevant state of fullness of the FIFO store 25 to an EXCLUSIVE-OR member 63 the second input of which is controlled by the signal RS described above which characterises the reading of information from the information store. The EXCLUSIVE-OR member 63 releases a control magnitude to the digital-to-analog converter 42 described above which in turn delivers an analog control signal VC to the comparison circuit 43 (FIG. 1).

The counting impulses for the address counters 50 and 51 are delivered via connecting circuits which each consist of two AND members 55,56 and 58,59, respectively, and an OR member 54 or 57, respectively. The signals released by these connecting circuits are each fed via delay circuits 52 and 53, respectively. This ensures that the particular counting impulse delivered to an address counter 50 or 51 is not supplied until an information input or removal operation at the FIFO store 25 is completed.

The inputs of the AND members 55,56,58,59 are fed with control signals which are delivered by a central control circuit. These control signals are the signals WS, CLD and $\overline{E}$, for the AND member 55. The signal WS denotes a recording process with which information is recorded in the information store. The signal CLD is the timing signal read by the timing signal store 15 (FIG. 1) and subsequently prepared. The signal $\overline{E}$ is supplied by the comparison circuits 60 and denotes the level of fullness of the FIFO store 25 if this store contains information, i.e. is not completely empty. The AND member 56 is controlled by the signals RS, CLC and $\overline{E}$.

The signal RS has already been described and denotes the reading process of information from the information store, the signal CLC is a timing signal which is delivered by the computer 27 (FIG. 1) via the data channel 26.

The connecting circuit consisting of the members 54,55 and 56 thus supplies a signal to the delay circuit 53 when either the AND member 55 or the AND member 56 is enabled. The AND member 55 is enabled when information is to be recorded in the information store, the FIFO store contains information and the timing signal from the timing signal store 15 has been given. The AND member 56 is enabled when information has been read from the information store, the timing signal from the data channel has been given and information is contained in the FIFO store 25.

The connecting circuit consisting of the members 54,55 and 56 thus supplies counting signals for counting the addressing operations during storage of information in the FIFO store 25. This storage of information occurs when information is to be recorded in the information store, since then information is removed from the FIFO store 25 to provide space for the further storage of information from the data channel 26. Furthermore, information is stored in the FIFO store 25 when information signals from the information store have been read. Accordingly, the multiplexer 61 is brought into the switching position by the output signal of the OR member 54, which enables addressing for information storage operations.

The connecting circuit consisting of the members 57,58 and 59 delivers counting signals for the address counter 50 which counts the addressing operations during removal of information from the FIFO store 25. The AND member 58 is controlled by the signals RS, CLD and $\overline{F}$. The signal $\overline{F}$ is delivered by the comparison circuit 60 and shows that the maximum fullness of the FIFO store 25 has not been reached, i.e. that its limit of capacity has not yet been attained. In this state, it is therefore possible to store information in the FIFO store 25; this process is controlled by the signal RS already described which causes information from the information store to be read. At the same time, corresponding information can be retrieved from the FIFO store 25; the corresponding addressing is counted by the address counter 50.

The AND member 59 is controlled by the signals WS, CLC and $\overline{F}$. These signals have already been described and the counting signal released accordingly also effects counting of information retrieval operations by the address counter 50. If information signals have been recorded in the information store, this corresponds to an information retrieval operation from the FIFO store 25.

In the manner described above, the counting positions of the two address counters 50 and 51 are continuously compared with one another in the comparison circuit 60 and a corresponding control signal is released to the EXCLUSIVE-OR member 63.

The flow of information into the FIFO store 25 or out of it via the channels 26,29 and 40 is also controlled via connecting members. The information signal channels in FIG. 2 are designated as in FIG. 1, and the flow of information in the particular channel is carried out in dependence on the enabling of an AND member 64,65,67,68. The OR member 66 passes information signals into the FIFO store 25 if either the AND member 64 or the AND member 65 is enabled. Information from the computer 27 (FIG. 1) and three different control signals WS, CLC and $\overline{F}$ are fed into the AND member 64 via four inputs. The three control signals have already been described. The AND member 64 is enabled when information has been released from the computer 27, information signals are to be recorded in the information store, the timing signal of the computer 27 is available and the FIFO store is not completely full.

The AND member 65 is enabled if information signals are to be recorded in the FIFO store 25 from the information store via the channel 40. This occurs depending on the occurrence of the control signals RS, CLD and $\overline{F}$. The storage of information signals in the FIFO store 25 thus occurs when information signals from the information store are read, the timing signals of the timing signal store are available and the FIFO store is not yet completely full.

The retrieval of information from the FIFO store 25 takes place via the two AND members 67 and 68 towards the computer 27 via the channel 26 and towards the information store via the channel 29. The flow of information to the computer 27 depends on the three control signals CLC, RS and $\overline{E}$ having been delivered. This means that the flow of information occurs when information signals from the information store are read and the FIFO store 25 contains information. This process is controlled by the timing signals CLC which are delivered by the computer 27.

The flow of information via the channel 29 occurs in dependence on the enabling through of the AND member 68, i.e. when the control signals CLD, WS and $\overline{E}$ occur. The corresponding state corresponds to the recording of information in the information store when the timing signal CLD delivered and prepared by the timing signal store 15 has been released and the FIFO store 25 contains information.

FIG. 3 shows the paths of the signals, to illustrate the method of functioning of part of the circuit shown in FIG. 1. CLD shows the path of the timing signal read by the timing signal store 15 after being regulated to a constant amplitude and after being prepared in the phase and frequency synchronizing circuit 23 for a speed which varies from a low value to a high value. It will be seen that the frequency of the timing signal is altered accordingly from a low value to a high one. WI shows, for example, the path of binary information signals which are to be recorded on the magnetic tape 10, being controlled by the digitalised timing signal CLD. These serial information signals occur in the coding circuit 30 and are coded, for example, according to the known NRZ process. WC shows the corresponding path, for the signals fully coded, e.g. according to the known FM process, of a record current in the magnetic head 20 by which the information signals are recorded on the magnetic tape 10. The coding process on which this record current is based operates with binary phase shift and merely constitutes an example of several possible coding processes.

Figure 4A:
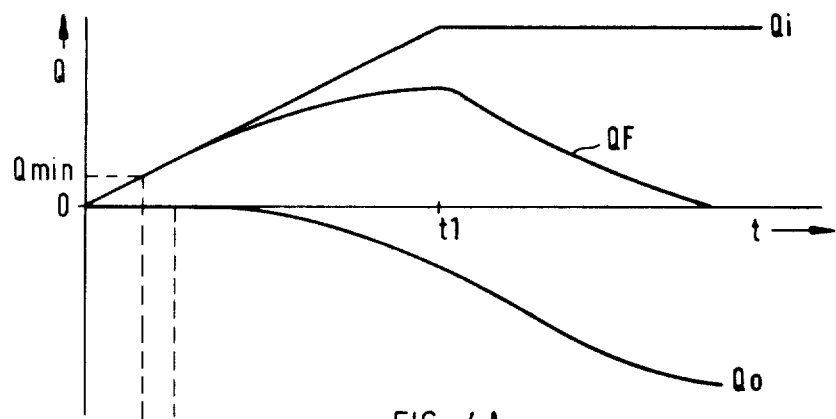
FIGS. 4A and 4B illustrates graphical representations of the reciprocal action between the level of fullness of a buffer store of the type described and the speed of the information store.
Figure 4B:
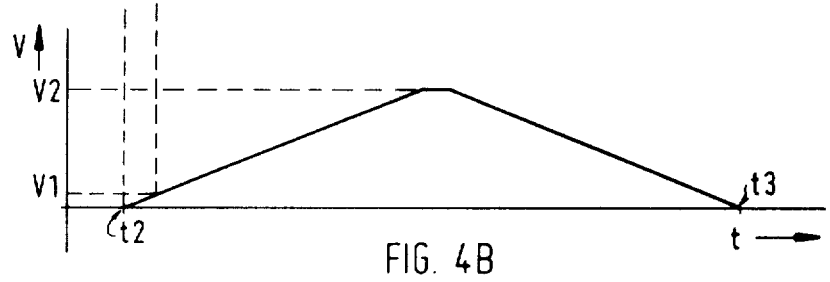

FIGS. 4a and 4b show graphical representations of the course of the level of fullness QF of the FIFO store 25 and the course of the speed of the information store 25 or of the magnetic tape 10 over a period of time. FIG. 4a shows the relationship between information Qi flowing in and information Qo flowing out, the difference between these yielding the level of fullness QF. Starting from a quantity of information Qmin, over a period of time, a process for storing information is shown which results in an increase in the level of fullness up to the time t1. The level of fullness QF then decreases again since at the same time information is being removed from the store as is shown by the curve Qo. When the quantity of information Qi which has flowed in coincides with the quantity of information Qo which has flowed out, the level of fullness QF has the value zero, so that the FIFO store 25 is then empty.

FIG. 4b shows, for the operations according to FIGS. 4a, the corresponding path of the speed of the information store. Between times t2 and t3, there is a linear increase in speed starting from speed 0 through the speed V1 up to speed V2 which is retained for a pre-determined time. Then the information store is slowed down again until at t3 it reaches the speed 0. This more or less coincides with the time when the FIFO store 25 has also reached the level of fullness 0.

The two graphical diagrams according to FIGS. 4a and b also show that the start of the information store takes place at the time t2 at which a pre-determined quantity of information Qmin is contained in the FIFO store 25. It can also be seen that when a pre-determined speed V1 is reached, the removal of information starts as shown by the curve Qo in FIG. 4a.

The subsequent acceleration and slowing down according to the curve shown in FIG. 4b occurs in the manner described by means of the control magnitude produced according to the process of the invention.

FIG. 5 shows more clearly the circuit 22 shown in FIG. 1 for regulating and preparing the signals.

The partial circuits 33, 34, 38 and 39 are shown in their structure and their function is described hereinafter, insofar as this is necessary for the understanding of the invention.

The timing signal store 15 (FIG. 1) delivers, via the magnetic head 21, a timing signal of variable frequency and amplitude to the circuit input A. This timing signal is pre-amplified in an amplifier 341. It then passes via a resistor 346 into an amplifier 342 the output of which is connected to the amplifying and limiting circuit 36 described above. Moreover, this amplifier output is connected via a diode 344 to the input of an amplifier 343 with storage properties. The output signal of this amplifier 343 controls a field-effect transistor 345. The latter forms, with the resistor 346, a voltage divider and the voltage tapped at this voltage divider controls the amplifier 342 as the input signal. The amplifiers 342 and 343 and the voltage divider from the resistor 346 and the transistor 345 form a regulating circuit which delivers, at its output, the timing signal with a constant amplitude, i.e. independently of the speed of the timing signal store 15. Inside this regulating circuit, the amplifier 343 produces the positioning magnitude by means of which internal resistance of the field effect transistor 345 is regulated. The amplifier 343 is regulated to a constant input voltage. The timing signal thus regulated to a constant amplitude has the form of a rectangular signal after being limited in the circuit 36.

This rectangular signal is fed into the circuit 39 which contains a circuit 395 for producing edge impulses. With each edge of the rectangular timing signal, an impulse is produced; these edge impulses are supplied at C to a phase and frequency synchronizing circuit shown in FIG. 6 which will be described hereinafter.

The circuit 39 shown in FIG. 5 also contains three NAND members 391, 393 and 394 and a negator 392. The reading signal RS is supplied to this connecting circuit which controls the NAND member 391 via the negator 392. The NAND member 393 is controlled by the output signal G of a filter 38 which will be described hereinafter; its output signal is supplied to the second input of the NAND member 394 the first input of which is controlled by the rectangular timing signals. The output of the NAND member 394 is connected to the input of the circuit 395 described above for producing edge impulses.

The information signals read by the magnetic head 20 of the magentic tape 10 pass via the input B of the circuit shown in FIG. 5 into the amplifier circuit 33 which contains two amplifiers 331 and 332. These are connected to one another via a voltage divider consisting of a resistor 336 and a field-effect transistor 335. This field-effect transistor 335 is controlled by the positioning magnitude produced by the amplifier 343 described above. Read information signals are then available at the output of the amplifier 332, the amplitude of these signals being regulated to a constant value regardless of the speed of the magnetic tape 10. These information signals are fed into an amplifying and limiting circuit 37, the output F1 of which is connected to the input of the filter circuit 38. This latter is thus controlled by a rectangular signal corresponding to the information signals read.

The filter circuit 38 consists essentially of four bistable circuits 382, 383, 384 and 385 connected one behind the other. The timing inputs of these bistable circuits are controlled by means of the control input D of the circuit shown in FIG. 6 which will be described later. The bistable circuits 382-385 are connected to one another so as to form a shift register. The individual stages of this shift register are connected to two NAND members 386 and 387 in the manner shown, the outputs of which are connected to the inputs of another bistable circuit 388. The input of the shift register is controlled by the signal F1 described above which is fed into one input of the first bistable circuit 382 in an unchanged state and is fed to the second input of this bistable circuit 382 via an inverter 381.

As will be described hereinafter, a timing signal is fed via the control input D of the filter circuit 38 with a frequency such that, only when controlled by an input signal F1 which is broader than a prescribed minimum impulse width, can the four bistable circuits 382-385 assume corresponding switching positions and thus enable the bistable circuit 388 connected behind them to be put into action. This means that a signal only appears at the signal output G when the above-mentioned condition of prescribed impulse width is fulfilled. The circuit 38 can therefore be regarded as a filter circuit which acts as a low-pass filter with a sharply defined forward characteristic. This circuit does not let through any signals which are narrower than the prescribed signal width. It is important that these properties of the filter circuit 38 match the particular speed of the reading operation, i.e. the critical frequency of the low-pass filter depends on the variable speed of the information store 10. This can be attributed to the fact that the timing signal supplied at D, which will be described hereinafter, for the bistable circuits 382 and 385 has a frequency dependent on the speed of the information store 10.

The output signal G of the filter circuit 38 is likewise passed via the circuit 395 within the circuit 39 for producing edge impulses C.

Figure 6:
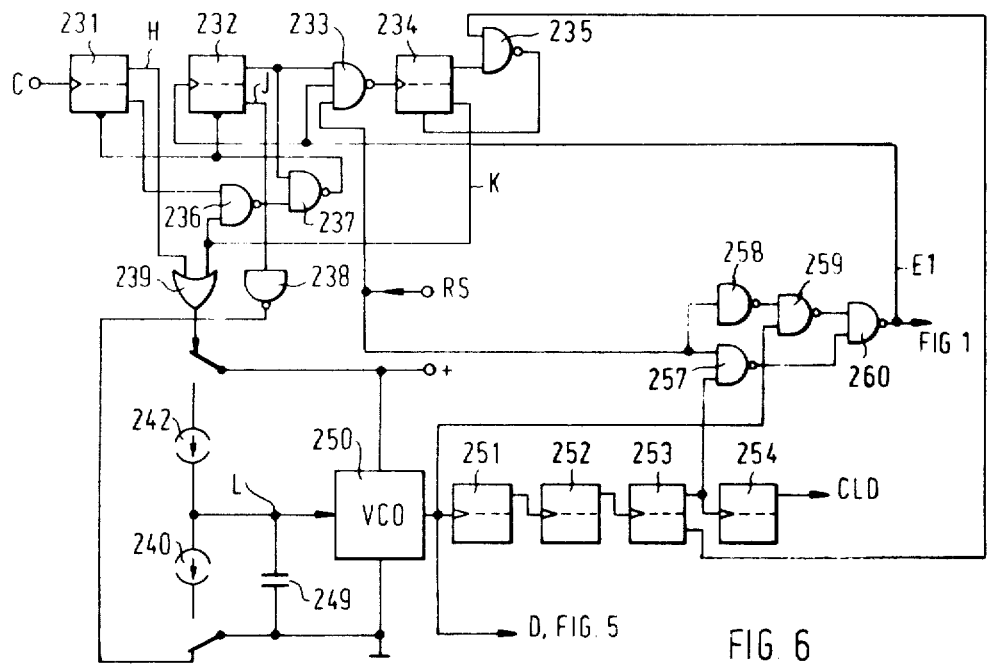
FIG. 6 is a the block circuit diagram of the control of a central timing generator by means of the signals obtained from the circuit according to FIG. 5.

FIG. 6 shows a phase and frequency synchronizing circuit which is also termed a phase-lock-loop generator (PLL) and contains a central timing generator 250. This circuit is controlled via the input C by the output signals of the circuit shown in FIG. 5 and, at its output D, supplies a timing signal which is produced by the central timing generator 250. At RS, the control signal is fed in, which denotes a reading operation at the information store 10, in the manner described above.

Figure 7:
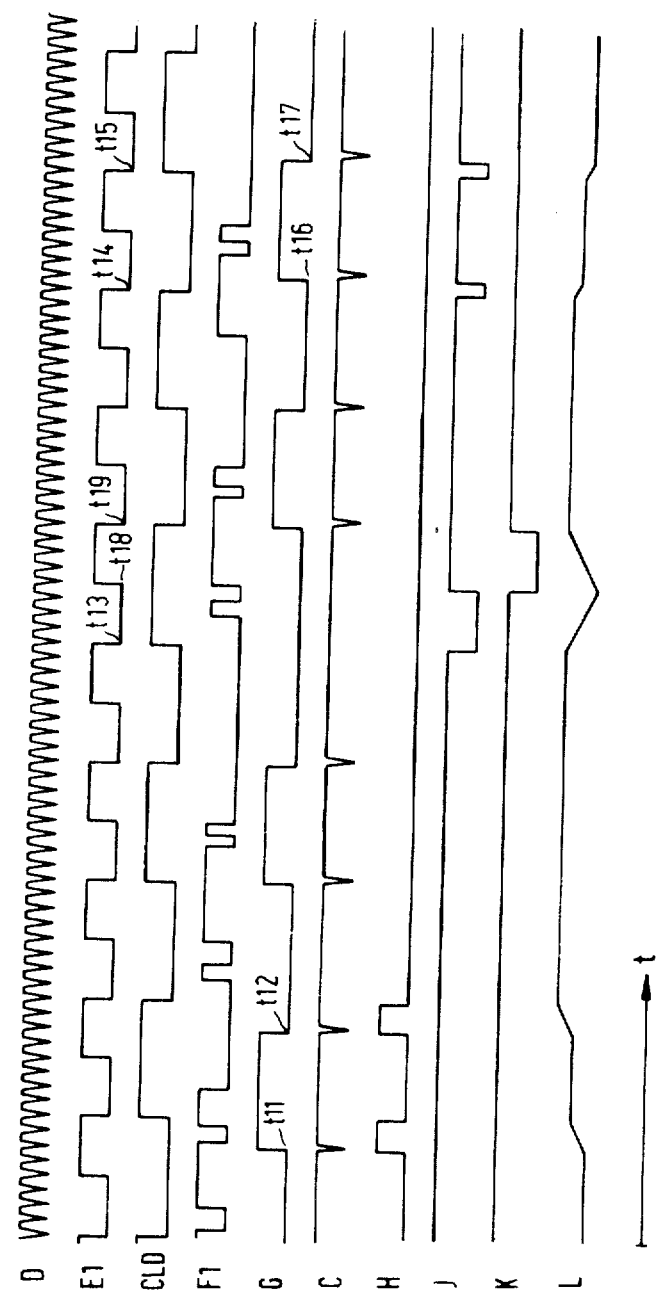
FIG. 7 illustrates graphical diagrams of signal paths in the circuits according to FIGS. 5 and 6.

In the circuit shown in FIG. 6, a recording timing signal E1 is produced during the recording process, which is used for coding the information signals to be recorded, in the circuit 30 (FIG. 1). During the reading process, a timing basic signal D and a timing reading signal E1 are produced, and these signals are used in the filtering and decoding of the information signals read in the circuits 38 and 24 (FIG. 1). During the recording process, for example, the times for possible zero-axis crossings of the record current are derived from the timing singals E1 and during the reading process the optimum time for evaluating the reading signal delivered by the low-pass filter 38 (FIG. 1) is determined. FIG. 7 shows times for the optimum evaluation of the filtered reading signals in the case of positive edges of the signal E1. It is important that, in this timing-producing circuit, during the reading process the signal E1 can be optimally set to the filtered reading signal G which has not yet been decoded, even though this signal has an irregular path owing to the information it contains. In previously known processes, so-called data windows are generally used to evaluate the reading signals, these data windows having a fixed time interval from a reading cycle or the particular preceding information signals. The reading signals can never be evaluated at a truly optimum time over the total allowable working range but on the contrary compromise is always necessary. The process made possible with the circuit arrangement according to FIG. 6 results in a substantially safer evaluation of the reading signals and thus a reduced risk of error in the reading operation.

Edge impulses which have been derived either from the timing signals read by the timing signal stored 15 or from the timing signals read by the information store 10 may reach the circuit input C.

By means of the central timing generator 250, impulses are produced which control the counter flip-flop circuits 251,252,253 and 254 connected behind it. Regardless of whether, from the circuit arrangement according to FIG. 5, edge impulses are passed into the input C which have been derived from read timing signals of the timing signal store 15 or from timing signals of the information store 10, with the circuit shown in FIG. 6 either every impulse or every eighth impulse of the central timing generator 250 is regulated so as to be synchronized in phase and frequency with the input impulses. This adjustment is obtained with the flip-flop circuits 231,232,234 connected up as a phase discriminator and the constant current sources 240 and 242 connected thereto. The constant current sources 240 and 242 produce a control voltage L which regulates the frequency of the central timing generator 250, at a storage member 249. The output signals of the central timing generator 250 have a substantially higher frequency, for example eight times the frequency of the timing signals provided by the timing signal store 15. This serves to produce a prepared timing signal which can be supplied at D to the filter circuit 38 shown in FIG. 5 and also serves to remove any stepped-down timing signal which control the phase discriminator circuit at the bistable circuits 231 and 232 and which control the re-setting of the bistable circuit 234 via a NAND member 235. Moreover, stepped-down-timing signals are fed in at CLD to the circuit 30 shown in FIG. 1 for coding.

For stepping-down the high timing signal frequency, the four bistable circuits 251–254 are provided, which are connected up behind one another so that the output signal of the central timing generator 250 is stepped-down sixteen times and delivers the stable recording cycle for the circuits 30 (FIG. 1) via the output CLD. The high frequency timing signal which is connected via D to the filter circuit 38 shown in FIG. 5 ensures, at this filter circuit, that the latter only lets through information signals with a minimum length of four timing impulses of the high timing frequency. The connecting circuit consisting of the NAND members 257,259 and 260 and the inverter 258 causes the timing signal D which has been reduced eight times or not reduced at all, and which has been delivered by the central timing generator 250, to be guided into the timing input of the bistable circuit 232 and an input of the NAND member 233. This takes place depending on the signal RS described above which denotes a reading process at the information store 10.

If the signals C at the input of the circuit shown in FIG. 6 lead the signal E1 at the output of the NAND member 260 (t11, t12, FIG. 7), the bistable circuit 231 is switched on. For the period when it is switched on, the control voltage L is increased via the constant current source 242 which is switched into action via the OR member 239 by the signal H of the bistable circuit 231. If a negative edge of the signal E1 follows at the outlet of the NAND member 260 when the corresponding counter position is reached in the counter formed by the flip-flop circuits 251–253, the bistable circuit 232 is switched on and immediately afterwards the bistable circuits 231 and 232 are re-set via the NAND members 236 and 237. Thus, the constant current source 242 is switched off again. The control voltage L still remains at the storage member 249.

The increase in the control voltage L described above results in an increase in frequency of the central timing generator 250, so that afterwards the phase difference between the signals C and the signal E1 is reduced.

If, at another time, the input signals C lag behind the signal E1 (t14,t15 FIG. 7) the bistable circuit 232 is switched on and remains in this state until the bistable circuit 231 is switched on by an impulse at the input C (t16,t17, FIG. 7) and thereby the bistable circuits 231 and 232 are re-set again via the NAND members 236 and 237. During the switched-on state of the bistable circuit 232, the constant current source 240 is switched on via the inverter 238, so that current can flow out of the storage member 249 via the constant current source 240 and the control voltage L is reduced in the sense of reducing the frequency of the central timing generator 250.

If an edge is missing (t13, FIG. 7) in the input signals C owing to a phase shift caused by the information contained, the bistable circuit 232 is also switched on. If this switched-on state lasts until the time t18 (FIG. 7) when a rear edge of the signal E1 occurs, the bistable circuit 234 is switched on via the NAND member 233. Thus, the bistable circuit 232 is re-set via the NAND members 236 and 237. In the interval of time from t13 to t18 (FIG. 7) the constant current source 240 is switched into action with the signal J of the bistable circuit 232. The loss of charge of the storage member 219 which this entails is subsequently balanced out again during the period t18-t19 (FIG. 7) by control via the bistable circuit 234 with the signal K via the OR member 239 at the constant current source 242. The bistable circuit 234 is resaet at time t19 via the NAND member 235.

Thus, the essential elements of the circuit shown in FIG. 6 are the bistable circuit 234 and the constant current source 242 switched into action thereby via the signal K and the OR member 239. This source is switched on when no impulse has appeared at the input C up to the negative edge of the signal E1. This may be the case, for example, when an edge is missing inside the signal G in the case of zero information with FM coding. The reduction of the control signal L thus caused, resulting from the switching on of the bistable circuit 232, would occur erroneously, so that it has to be corrected by an opposite signal of equal magnitude. For this purpose, the current of the constant current source 242 is used by controlling it via the bistable circuit 234 which then increases the control voltage L again at the storage member 249.

The signals D-L explained above and shown in FIG. 7 illustrate the function of the circuits shown in FIGS. 5 and 6. D is the high frequency timing signal produced at the corresponding output of the central timing generator 250. CLD is the timing signal reduced sixteen times which appears at the output of the bistable circuit 254. F1 is the path of an information signal which may occur for example at the input of the filter circuit according to FIG. 5. This signal path contains information and interference which take the form of short impulses and the output signal G of the filter circuit 38 shows that only those impulses which have the prescribed minimum length described are present.

Thus, with the apparatus shown in FIGS. 5 and 6, it is possible to filter out all interference signals which are shorter than a specific fraction of the width of an expected information signal, for the entire range of speeds of the information store 10. In this way, a substantially greater certainty of recognition of data signals and thus a reduction in the risk of error during the reading operation are obtained.

Owing to the digital time-controlled method of operation, the filter circuit 38 has the advantage over filters operating in an analog manner that the transmission range exactly matches the data signal rate and thus the working speed of the information store 10 and is not, or example, optimised only with regard to a specific operational point.

The embodiments of the invention in which an exclusive property or privilege is claimed are defined as follows:

1. An apparatus for transferring information signals from a variable speed information store into a data processing system having a data channel and a cyclically operating buffer store enabling asynchronous storage and retrieval of information and having an associated circuit which evaluates it respective level of fullness, comprising the improvement wherein the circuit which evaluates the level of fullness comprises an address counter which counts the incoming information for storage in the buffer store and the outgoing information retrieved from the buffer store and wherein the address counters are connected to a comparison circuit which compares the counter positions, which comparison circuit delivers to its output a signal which indicates the speed of the information store.

2. The improvement according to claim 1, wherein a magnetic tape is provided as the information store, the drive of which is mechanically coupled to a timing signal store, wherein a magnetic disc is provided on its circumference with stored timing signals, which disc is provided on the drive shaft of the magnetic tape store to serve as the timing signal store.

3. The improvement according to claim 2, wherein for preparing signals read from the information store and/or the timing signal store there is provided an amplitude regulating circuit, which is controlled by the signal which indicates the speed.

4. The improvement according to claim 2, wherein for preparing signals read from the information store and the timing signal store there is provided an amplitude regulating circuit having a regulating circuit associated with the timing signal channel, the regulated quantity of which serving also to regulate the amplitude of the information signals.

5. The improvement according to claim 4, wherein the timing signal channel and the information signal channel are fed together into a circuit for producing edge impulses.

6. The improvement according to claim 5, wherein the circuit for producing edge impulses controls a phase discriminator circuit which serves to synchronize a central timing generator.

7. The improvement according to claim 6, wherein the central timing generator operates, during the reading operation, with a substantially higher frequency, preferably eight times the frequency of the timing information signals, and controls, with its output signals, the timing inputs of the bistable circuits of the low-pass filter.

8. The improvement according to claim 7, wherein the central timing generator is connected to a step-down circuit for stepping down the frequency of its output signals.

9. The improvement according to claim 8, wherein the step-down circuit delivers timing signals for recording and reading information in the information store.

10. The improvement according to claim 6, wherein a fixed-phase regulating circuit is provided as the phase discriminator circuit and is controlled by the coded information signals.

11. The improvement according to claim 10, wherein a change in the control voltage produced by the regulating circuit for the central timing generator, this change being caused by the absence of information signal edges, is interrupted on the expiry of half a bit time and is corrected by an opposite change of equal magnitude.

12. The improvement according to claim 10, wherein the fixed-phase regulating circuit contains two bistable circuits, wherein the timing input of one of the bistable circuits is controlled by the output signals of the circuit for producing edge impulses, wherein the timing input of the second bistable circuit is controlled by the timing reading signals of the step-down circuit, wherein the re-setting of both bistable circuits occurs via a NAND connection which is controlled by the 0-output signal of the first bistable circuit and by the 1-output signal of the second bistable circuit, and wherein the 1-output signal of the first bistable circuit and the 0-output signal of the second bistable circuit are used to increase or reduce a control voltage for the central timing generator.

13. The improvement according to claim 12, wherein the 0-output signal of the first bistable circuit is passed to a further NAND member which controls the first NAND member and is controlled at its second input by the 0-output signal of a third bistable circuit the timing input of which is controlled via a NAND connection by the one-output signal of the second bistable circuit, the timing reading signal and a signal denoting the reading operation at the information store, and which is re-set by its 1-output signal via another NAND connection controlled by an output signal of the step-down circuit.

14. The improvement according to claim 13, wherein the 1-output signal of the first bistable circuit and the 0-output signal of the third bistable circuit switches on, via an OR connection, a constant current source which charges a storage member at the control voltage input of the central timing generator.

15. The improvement according to claim 13 wherein the 0-output signal of the second bistable circuit switches on a constant current source which discharges a storage member at the control voltage input of the central timing generator.

16. The improvement according to claim 2, wherein a low-pass filter is arranged in the information signal channel and has a critical frequency dependent on the speed of the information store.

17. The improvement according to claiim 16, wherein the low-pass filter is formed by bistable circuits connected behind one another in the manner of a shift register, the outputs of which for the first switching state control the first input of another bistable circuit via a NAND connection and the outputs of which for the second switching state control the second input of the another bistable circuit via another NAND connection.

* * * * *